United States Patent
Itano et al.

(10) Patent No.: US 7,993,447 B2
(45) Date of Patent: Aug. 9, 2011

(54) PIGMENT DISPERSED LIQUID, INK COMPOSITION FOR INKJET RECORDING, AND INK CARTRIDGE, RECORDING METHOD, RECORDING SYSTEM AND ARTICLE RECORDED USING THE SAME

(75) Inventors: Masaaki Itano, Nagano-ken (JP); Miharu Kanaya, Nagano-ken (JP); Chie Saito, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1191 days.

(21) Appl. No.: 11/365,294

(22) Filed: Mar. 1, 2006

(65) Prior Publication Data

US 2006/0213390 A1 Sep. 28, 2006

(30) Foreign Application Priority Data

Mar. 28, 2005 (JP) ................ 2005-092548
Aug. 8, 2005 (JP) ................ 2005-230023

(51) Int. Cl.
- C08K 5/00 (2006.01)
- C09B 67/50 (2006.01)
- C09B 48/00 (2006.01)
- C09C 1/32 (2006.01)
- C09C 1/14 (2006.01)
- C09C 1/36 (2006.01)
- C09C 1/10 (2006.01)
- C09C 1/34 (2006.01)
- C09C 1/22 (2006.01)
- C09C 1/44 (2006.01)
- C04B 14/00 (2006.01)

(52) U.S. Cl. ............ 106/499; 106/31.6; 106/31.86; 106/412; 106/413; 106/414; 106/429; 106/432; 106/447; 106/452; 106/453; 106/460; 106/476; 106/480; 106/493; 106/496; 106/497; 106/498

(58) Field of Classification Search .......... 106/31.6, 106/31.68, 61.78, 31.86, 493, 496–499, 412–414, 106/429, 432, 447, 452–453, 460, 476, 480; 523/160

See application file for complete search history.

(56) References Cited

U.S. PATENT DOCUMENTS

| | | | | |
|---|---|---|---|---|
| 6,153,001 A * | 11/2000 | Suzuki et al. | ............ | 106/31.65 |
| 6,187,086 B1 * | 2/2001 | Rehman | ............ | 106/31.86 |
| 6,599,356 B2 * | 7/2003 | Komatsu et al. | ............ | 106/493 |
| 2003/0176533 A1 * | 9/2003 | Cottrell et al. | ............ | 523/160 |

FOREIGN PATENT DOCUMENTS

| | | |
|---|---|---|
| JP | 8-3498 | 1/1996 |
| JP | 11-323232 | 11/1999 |
| JP | 2000-017189 | 1/2000 |
| JP | 2000-345093 | 12/2000 |
| JP | 2001-262023 | 9/2001 |
| JP | 2003-26972 | 1/2003 |
| JP | 2003-64292 | 3/2003 |
| JP | 2003-253178 | 9/2003 |
| JP | 2003-535949 | 12/2003 |

OTHER PUBLICATIONS

Computer-Generated English Translation of JP 2003-535949 dated Dec. 2, 2003.
Computer-Generated English Translation and Patent Abstracts of Japan of JP 2003-253178 dated Sep. 10, 2003.
Computer-Generated English Translation and Patent Abstracts of Japan of JP 2003-64292 dated Mar. 5, 2003.
Computer-Generated English Translation and Patent Abstracts of Japan of JP 2003-26972 dated Jan. 29, 2003.
Computer-Generated English Translation and Patent Abstracts of Japan of JP 2000-345093 dated Dec. 12, 2000.
Computer-Generated English Translation and Patent Abstracts of Japan of JP 11-323232 dated Nov. 26, 1999.
Computer-Generated English Translation and Patent Abstracts of Japan of JP 8-3498 dated Jan. 9, 1996.
English Abstract of Japanese Application 2000-017189 Published Jan. 18, 2000.
English Abstract of Japanese Application 2001-262023 Published Sep. 26, 2001.

* cited by examiner

*Primary Examiner* — Anthony J Green
*Assistant Examiner* — Pegah Parvini
(74) *Attorney, Agent, or Firm* — Ladas & Parry LLP

(57) ABSTRACT

A pigment dispersed liquid prepared by heat-treating an aqueous pigment dispersion containing a self-dispersing pigment, but not a dispersing resin.

6 Claims, No Drawings

PIGMENT DISPERSED LIQUID, INK COMPOSITION FOR INKJET RECORDING, AND INK CARTRIDGE, RECORDING METHOD, RECORDING SYSTEM AND ARTICLE RECORDED USING THE SAME

CROSS-REFERENCES TO RELATED APPLICATIONS

The entire disclosure of Japanese Patent Application No. 2005-230023, filed Aug. 8, 2005, is expressly incorporated herein by reference.

BACKGROUND

1. Technical Field

The present invention relates to an ink composition with a minimal change in its properties over a long period of time and with high reliability in terms of discharge stability, etc.; an ink cartridge, a recording method, a recording system and an article recorded using that ink composition; and a pigment dispersed liquid constituting that ink composition.

2. Related Art

Conventionally, techniques such as heat-treating a resin-containing pigment dispersion, or heating with the addition of a basic substance have been developed. A pigment dispersed liquid obtained through that kind of heat treatment has been utilized for ink compositions (as disclosed in JP-A-2000-345093, JP-A-2003-64292, JP-A-2003-26972, JP-A-2003-253178, JP-T-2003-535949 and others).

However, when an ink composition made using the conventional techniques is left unused for a long period of time, its viscosity can change, which affects inkjet discharge performance. In particular, ink compositions containing a high concentration of pigments have an especially strong tendency to do so.

SUMMARY

An advantage of some aspects of the invention is the provision of an ink composition for inkjet recording that has no change in properties such as viscosity, even after it is left unused for a long period of time, and that can achieve high reliability in terms of stable inkjet discharge performance, even with a high solid content.

Another advantage of some aspects of the invention is the provision of an ink cartridge, a recording method, a recording system and an article recorded using the above-described excellent ink composition for inkjet recording, and the provision of a pigment dispersed liquid constituting that ink composition.

According to a first aspect of the invention, provided is a pigment dispersed liquid prepared by heat-treating an aqueous pigment dispersion containing a self-dispersing pigment, but not a dispersing resin.

It is preferable that the pigment dispersed liquid is prepared either by heat-treating a pigment dispersion consisting of a self-dispersing pigment and water and thereafter adding an organic solvent, or by heat-treating a pigment dispersion containing a self-dispersing pigment, water and an organic solvent, but not a dispersing resin.

It is preferable that the organic solvent includes one or more types selected from the group consisting of glycerin, a glycol ether, an alkanediol, an acetylene glycol and a pyrrolidone.

It is preferable that the heat-treatment is performed with a temperature of 50 to 100° C. and a duration of 2 to 72 hours.

It is preferable that the pigment concentration in the pigment dispersed liquid is 10% or more by weight.

According to a second aspect of the invention, provided is a method for producing a pigment dispersed liquid, including heat-treating an aqueous pigment dispersion containing a self-dispersing pigment, but not a dispersing resin.

It is preferable that a pigment dispersion consisting of a self-dispersing pigment and water is heat-treated and thereafter an organic solvent is added.

It is preferable that a pigment dispersion containing a self-dispersing pigment, water and an organic solvent, but not a dispersing resin is heat-treated.

According to a third aspect of the invention, provided is an ink composition for inkjet recording prepared using the above-described pigment dispersed liquid, or the pigment dispersed liquid obtained by the above-described method.

It is preferable that the pigment content in the ink composition is 6% or more by weight.

It is preferable that the ink composition further contains an acetylene glycol based surfactant.

It is preferable that the ink composition further contains a penetrating agent.

It is preferable that the penetrating agent is an alkanediol and/or a glycol ether.

It is preferable that the ink composition further contains a solid wetting agent.

According to a fourth aspect of the invention, provided is an ink cartridge including the above-described ink composition for inkjet recording.

According to a fifth aspect of the invention, provided is a recording method for generating an image by using the above-described ink composition for inkjet recording.

According to a sixth aspect of the invention, provided is a recording system for generating an image by using the above-described ink composition for inkjet recording.

According to a seventh aspect of the invention, provided is an article recorded by generating an image by using the above-described ink composition for inkjet recording.

DESCRIPTION OF EXEMPLARY EMBODIMENTS

Preferred embodiments of the pigment dispersed liquid and the ink composition for inkjet recording according to the invention are explained below.

As stated above, the pigment dispersed liquid according to the invention is prepared by heat-treating an aqueous pigment dispersion containing a self-dispersing pigment, but not a dispersing resin. The aqueous pigment dispersion referred to herein means a substance in which a pigment is dispersed in a solvent mainly composed of water or other aqueous media.

With the above configuration, the pigment dispersed liquid according to the invention can constitute ink that has no change in properties such as viscosity, even after it is left unused for a long period of time, and that can achieve high reliability in terms of stable inkjet discharge performance, even with a high solid content. Thus, the pigment dispersed liquid is useful for an ink composition for inkjet recording.

Preferred modes for the pigment dispersed liquid according to the invention include:

(1) A pigment dispersed liquid prepared by heat-treating a pigment dispersion consisting of a self-dispersing pigment and water and then adding an organic solvent; and (2) A pigment dispersed liquid prepared by heat-treating a pigment dispersion containing a self-dispersing pigment, water and an organic solvent, but not a dispersing resin.

The above modes, particularly (2) above, are preferable since, according to those modes, it is possible to obtain an ink composition with stabilized viscosity which indicates stable preservation.

The self-dispersing pigment used for the pigment dispersed liquid according to the invention is a pigment that is treated so as to have on its surface one or more functional groups (dispersibility-imparting groups) selected from the group consisting of —COOH, —CHO, —OH, —SO$_3$H, and salts thereof, and that also can be dispersed uniformly in an aqueous ink composition without a dispersing agent being added. "Dispersion" referred to herein means the state where a self-dispersing pigment exists stably in water without the existence of any dispersing agent, including not only the state of being dispersed, but also the state of being dissolved. An ink composition including a self-dispersing pigment exhibits better dispersion stability compared to ordinary ink compositions including a dispersing agent and a pigment that is not a self-dispersing pigment, and furthermore, since it exhibits proper viscosity, it can contain a greater amount of pigment and so generate images, such as characters or figures having excellent color, especially on plain paper. Moreover, the fluidity of the ink composition mixed with a self-dispersing pigment is not deteriorated even if it is further mixed with a penetrating agent effective for improving printing quality (explained later), and accordingly, by using that penetrating agent in combination, printing quality can also be improved.

The same pigments as those used in normal ink compositions for inkjet recording can be used for pigments to be made into a self-dispersing pigment, examples of which include: organic pigments such as carbon black, azo lake, insoluble azo pigments, condensed azo pigments, chelated azo pigments, phthalocyanine pigments, perylene pigments, perinone pigments, quinacridone pigments, thioindigo pigments, isoindolinone pigments, quinophthalone pigments, dioxazine pigments, anthraquinone pigments, nitro pigments, nitroso pigments, and aniline black; and inorganic pigments such as titan white, zinc oxide, lead white, carbon black type, colcothar, vermilion, cadmium red, chrome yellow, ultramarine blue, cobalt blue, cobalt violet, and zinc chromate pigments. Furthermore, any pigments can be used so long as they are capable of being dispersed in an aqueous medium, even if they are not indicated in a color index. Of the above, azo lake, insoluble azo pigments, condensed azo pigments, chelated azo pigments, phthalocyanine pigments, perylene pigments, perinone pigments, quinacridone pigments, thioindigo pigments, isoindolinone pigments, quinophthalone pigments, dioxazine pigments, and anthraquinone pigment types are particularly preferable. Note that the "pigment" indicates a particulate solid normally insoluble in water, solvent, oil, etc.

A self-dispersing pigment can be prepared and obtained by chemically bonding, e.g., coordinating or grafting, a functional group or a molecule containing a functional group on the surface of a pigment via a physical treatment like vacuum plasma or a chemical treatment. For example, a self-dispersing pigment can be obtained by using a method disclosed in JP-A-8-3498. Also, commercially-manufactured products may be used as self-dispersing pigments, and preferred examples include "Microjet CW1" from Orient Chemical Industries, Ltd., and "CAB-O-JET200" and "CAB-O-JET300" from Cabot Corporation.

One example of a process for preparing a self-dispersing pigment (pigment surface oxidation-sulfonation) is described below. A solvent mixed with a pigment is subjected to high-speed shear dispersion using a high-speed mixer or similar, or to shock dispersion using a bead mill, jet mill or similar, so that a slurry pigment dispersed liquid is obtained. The pigment dispersed liquid is mixed with a treatment agent containing sulfur (such as sulfamic acid, fuming sulfuric acid, sulfuric acid, chlorosulfuric acid, fluorosulfuric acid, or amidosulfuric acid) while being slowly agitated, and then is heat-treated at a temperature of 60 to 200° C. to introduce the before-explained dispersibility-imparting groups onto the surface of the pigment. After removing the solvent from the pigment dispersed liquid, the treatment agent containing sulfur is removed by repeating the processes of water washing, ultrafiltration, reverse osmosis, centrifugation, filtration or similar, so that a self-dispersing pigment is obtained.

Other examples of the self-dispersing pigment include pigments subjected to a surface oxidation treatment involving Salt of hypochlorous acid oxidation, ozone oxidation (see JP-T-2003-535949), or similar.

Moreover, in order to improve stable ink preservation and to prevent nozzle clogging, the average particle diameter of the self-dispersing pigment is preferably 10 to 300 nm, more preferably 40 to 150 nm.

The pigment concentration in the pigment dispersed liquid according to the invention (i.e., the content of the self-dispersing pigment after the heat treatment) is preferably 10% or more by weight, and more preferably 12 to 20% by weight, in the pigment dispersed liquid.

It is preferable that an organic solvent used for the pigment dispersed liquid according to the invention includes one or more solvents selected from the group consisting of glycerin, a glycol ether, an alkanediol, an acetylene glycol and a pyrrolidone, to avoid dispersion deterioration due to the heat treatment and to stabilize viscosity. Of these, glycerin and glycol ethers are more preferable since they can improve viscosity stability particularly well.

As the organic solvent capable of being used for the invention, a preferable example of a glycol ether is triethylene glycol monobutyl ether; a preferable example of an alkanediol is 1,2-hexanediol; a preferable example of an acetylene glycol is a surfactant, specifically, Surfynol 465 (from Air Products and Chemicals, Inc.); and a preferable example of a pyrrolidone is 2-pyrrolidone.

It is preferable that the organic solvent content in a dispersion for preparing the pigment dispersed liquid according to the invention is 2 to 20% by weight, and it is adjusted to be a preferable amount (explained later) when an ink composition is prepared using the pigment dispersed liquid according to the invention.

According to the invention, a pigment dispersion containing the above-described self-dispersing pigment and organic solvent, but not a dispersing resin is heat-treated to prepare a pigment dispersed liquid. With the invention where the above-described self-dispersing pigment and no dispersing resin is used, it is possible to attain low viscosity despite a high pigment solid content, and to also achieve excellent color.

In order to avoid dispersion deterioration and suppress viscosity loss efficiently, it is preferable that the heat treatment for the pigment dispersion is performed with the temperature from 50 to 100° C. and the heating duration from 2 to 72 hours.

For example, if the heat treatment is performed at a temperature of 60 to 80° C. (preferably 65 to 70° C.), the heating duration is preferably 10 to 48 hours, and more preferably 15 to 24 hours.

Also, if the heat treatment is performed at a temperature of 80 to 100° C. (preferably 95 to 100° C.), the heating duration is preferably 2 to 15 hours, and more preferably 5 to 7 hours.

According to the invention, it is also possible to provide a pigment dispersed liquid production method including the step of heat-treating an aqueous pigment dispersion containing a self-dispersing pigment, but not a dispersing resin. This production method is a method suitable for obtaining the above-described pigment dispersed liquid.

Preferred embodiments of the pigment dispersed liquid production method according to the invention include:
(1) a method where a pigment dispersion consisting of a self-dispersing pigment and water is heat-treated and an organic solvent is added thereafter; and
(2) a method where a pigment dispersion containing a self-dispersing pigment, water, and an organic solvent, but not a dispersing resin is heat-treated.

The above embodiments, particularly (2), are preferable because an ink composition prepared using the obtained pigment dispersed liquid is one with stabilized viscosity which indicates stable preservation.

The ink composition for inkjet recording according to the invention is one prepared by using the above-described pigment dispersed liquid (hereinafter, the ink composition for inkjet recording according to the invention is also referred to simply as an "ink composition according to the invention").

In order for an ink composition prepared using the pigment dispersed liquid according to the invention to show a sufficient OD value, the content of the self-dispersing pigment in that ink composition is adjusted to be preferably 6% or more by weight, more preferably 6 to 13% by weight, and still more preferably 7 to 10% by weight.

Since the ink composition according to the invention is structured as above, even with a high solid content, it has no change in properties such as viscosity, even after it is left unused for a long period of time, and can achieve high reliability in terms of stable inkjet discharge performance.

The ink composition according to the invention is one used as a recording liquid that is discharged in the form of droplets from an inkjet printer head to generate images such as characters or figures on a recording medium such as paper via an inkjet recording system.

The above-described pigment dispersed liquid is used in the ink composition according to the invention, and so the above-described self-dispersing pigment is contained therein. In particular, in order to achieve a sufficient OD value, the content of the self-dispersing pigment in the ink composition is preferably 6% or more by weight, more preferably 6 to 13% by weight, and still more preferably 7 to 10% by weight.

The ink composition according to the invention is an aqueous ink composition normally containing water, preferably ion-exchange water, as a solvent.

The ink composition according to the invention may also contain as a solvent the below-mentioned organic solvent in addition to water. Specifically, it is preferable that the organic solvent is one compatible with water, capable of improving the penetration of an ink composition into a recording medium, with nozzle-clogging prevention, and further improving the solubility of ink composition components, such as a penetrating agent (explained later). Examples include: alkyl alcohols having a carbon number from 1 to 4 such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-metyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone; formamide; acetamide; dimethylsulfoxide; sorbit; sorbitan; acetin; diacetin; triacetin; and sulfolane, and these may be used alone or in a combination of two or more types, preferably with the content in the ink composition according to the invention being 0 to 10% by weight.

In order to improve printing quality, it is preferable that the ink composition according to the invention also contain an acetylene glycol based surfactant in addition to the pigment dispersed liquid.

Examples of the above acetylene glycol based surfactant include: 2,4,7,9-tetramethyl-5-decyne-4,7-diol; 3,6-dimethyl-4-octyne-3,6-diol; 3,5-dimethyl-1-hexyn-3-ol; and any of these substances in which 1 to 30 ethyleneoxy groups or propyleneoxy groups on average are added to each of their plural hydroxyl groups. Also, commercially manufactured products may be used as the above acetylene glycol based surfactant. Examples include "Surfynol 104PG50" and "Surfynol 465" (both product names from Air Products and Chemicals, Inc.). These may be used alone or in a combination of two or more types.

The content of the above acetylene glycol based surfactant in the ink composition according to the invention is preferably 0.1 to 3% by weight, and more preferably 0.5 to 1.5% by weight.

In order to further improve the adherence to a recording medium and enhance the smear resistance of recorded images, such as characters or figures, it is preferable that the ink composition according to the invention contains a penetrating agent. Preferred examples of the penetrating agent include: 1,4-butanediol; 1,3-butanediol; 1,5-pentanediol; 1,2-alkanediols e.g., 1,2-hexanediol; and 1,6-alkanediols e.g., 1,6-hexanediol (dihydric alcohols); glycol ethers such as diethylene glycol mono-n-butyl ether (DEGmBE), diethylene glycol mono-t-butyl ether (DEGmtBE), triethylene glycol mono-n-butyl ether (TEGmBE), propylene glycol mono-n-butyl ether (PGmBE) and dipropylene glycol mono-n-butyl ether (DPGmBE); and one or more types selected from the group consisting of the compounds represented by the following general formula:

$$RO-(PO)m-(EO)n-H$$

(wherein R, PO and EO respectively indicate an alkyl group with a carbon number of 4 to 10, a propyleneoxy group and an ethyleneoxy group, and $m \geqq 1$, $n \geqq 0$, and $m+n \leqq 20$), and DEGmBE, TEGmBE and DPGmBE are particularly preferable. Note that in the above general formula, m and n indicate the number of groups existing in a composition, and PO and EO may be added in a block or added randomly.

In order to improve the penetrating and quick-drying properties of the ink composition and effectively prevent ink bleed, it is preferable that the content of the penetrating agent in the ink composition according to the invention is 1 to 20% by weight.

In order to prevent nozzle clogging and further enhance reliability, it is preferable that the ink composition according to the invention contains a water-soluble glycol, examples of which include: glycerin; ethylene glycol; diethylene glycol; triethylene glycol; tetraethylene glycol; propylene glycol; dipropylene glycol; tripropylene glycol; polyethylene glycol with a molecular weight of 2,000 or less; trimethylene glycol; and isobutylene glycol, and these may be used alone or in a combination of two or more types. Glycerin is particularly preferable for improving the capability to eliminate clogging.

The content of water-soluble glycol in the ink composition according to the invention is preferably 1 to 30% by weight.

In order to improve the capability to eliminate clogging, it is preferable that the ink composition according to the invention contain a solid wetting agent such as urea and derivatives thereof; trimethylolethane; and trimethylolpropane. Trimethylolpropane is particularly preferable.

The content of the solid wetting agent in the ink composition according to the invention is 1 to 10% by weight, and more preferably 2 to 8% by weight.

In the ink composition according to the invention, resin particles may be used, examples of which include, but are not particularly limited to, acrylic resin, urethane resin, epoxy resin and polyolefin resin. These resins may be used alone or in a combination of two or more types.

It is preferable that the resin particles are added to the ink composition in the form of an emulsion of resin particles (e.g., so-called "acrylic emulsion") that is obtained via the emulsion polymerization of unsaturated monomers. This is because the resin particles added into the ink composition as they are may not be able to be dispersed sufficiently, and an emulsion is preferred when manufacturing the ink composition. In addition, an acrylic emulsion is preferred for the stable preservation of the ink composition.

An emulsion of the resin particles (such as an acrylic emulsion) can be obtained using a known emulsion polymerization process. For example, one can be obtained by using unsaturated monomers (such as unsaturated vinyl monomers) as a polymerization initiator and performing emulsion polymerization with respect to these monomers in water in the presence of a surfactant.

Examples of unsaturated monomers include: those normally used in emulsion polymerization, such as acrylate monomers, methacrylate monomers, aromatic vinyl monomers, vinyl ester monomers, vinyl cyan compound monomers, halide monomers, olefin monomers and diene monomers. More specific examples include: acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters e.g., vinyl acetate; vinyl cyan compounds such as acrylonitrile and methacrylonitrile; halide monomers such as vinylidene chloride and vinyl chloride; aromatic vinyl monomers such as styrene, α-methylstyrene, vinyltoluene, 4-t-butylstyrene, chlorostyrene, vinylanisole, and vinylnaphthalene; olefins such as ethylene and propylene; dienes such as butadiene and chloroprene; vinyl monomers such as vinyl ether, vinyl ketone, and vinyl pyrrolidone; unsaturated carboxylic acids such as acrylic acid, methacrylic acid, itaconic acid, fumaric acid, and maleic acid; acrylamides such as acrylamide, methacrylamide, and N,N'-dimethylacrylamide; and hydroxyl-group-containing monomers such as 2-hydroxyethyl acrylate, 2-hydroxypropyl acrylate, 2-hydroxyethyl methacrylate, and 2-hydroxypropyl methacrylate, and these may be used alone or in a combination of two or more types.

It is also possible to use cross-linkable monomers having two or more polymerizable double bonds, examples of which include: diacrylate compounds such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds such as trimethylolpropane triacrylate, trimethylolethane triacrylate, and tetramethylolmethane triacrylate; tetraacrylate compounds such as ditrimethylol tetraacrylate, tetramethylolmethane tetraacrylate, and pentaerythritol tetraacrylate; hexaacrylate compounds e.g., dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds such as trimethylolpropane trimethacrylate and trimethylolethane trimethacrylate; methylenebisacrylamide; and divinylbenzene. These may be used alone or in a combination of two or more types.

Moreover, in addition to the polymerization initiator and surfactant used in the emulsion polymerization, a chain-transfer agent, as well as a neutralizing agent or others may be used in the usual manner. Specifically, ammonia, and a hydroxide of an inorganic alkali, for example, sodium hydroxide and potassium hydroxide, are preferable as the neutralizing agent.

The resin particles may be mixed with the other components in the ink composition in the form of fine particle powder, but it is preferable that the resin particles are dispersed in an aqueous medium to form an emulsion (polymer emulsion), and then mixed with the other components in the ink composition.

In addition, both single-phase resin particles and multi-phase resin particles (core-shell structure) may be used.

In order to prepare uniform ink and to achieve ink stability, it is preferable that the resin particles are contained in the ink composition according to the invention in the form of an emulsion.

The "resin particle" used in the invention means water-insoluble resin that disperses in a dispersion medium mainly composed of water in particle form and water-insoluble resin that is dispersed in a dispersion medium mainly composed of water in particle form, and further includes any dried substance thereof. Also, the term "emulsion" used in the invention includes a dispersed substance of a solid and a liquid called a dispersion, latex, or suspension.

Furthermore, in order to improve dispersion stability of the above-described self-dispersing pigment, it is preferable that the emulsion is anionic. For the same reason, if a pigment whose surface is cationic (for example, a pigment dispersed using cationic groups made via a surface treatment) is used, it is preferable that the emulsion is cationic.

The emulsion can be produced as follows.

One example of an emulsion production method:

100 parts of ion-exchange water are put into a reaction container having a dripping device, a thermometer, a water-cooled reflux condenser and an agitator, and are mixed with 0.2 parts of a polymerization initiator while being agitated at a temperature of 70° C. in a nitrogen atmosphere. Then, a separately prepared monomer solution is dripped into that, causing a polymerization reaction yielding the initial substance. After that, the initial substance is mixed with 2 parts of a 10% polymerization initiator water solution and agitated at a temperature of 70° C., and is further mixed with a separately prepared reaction liquid and agitated, causing a polymerization reaction resulting in a polymerized reactant. That polymerized reactant is neutralized using a neutralizing agent so that its pH value is adjusted to be 8 to 8.5, and then is subjected to filtering using a filter with a pore diameter of 0.3 μm to remove coarse particles. Thus, an emulsion with a dispersoid of resin particles is obtained.

A polymerization initiator similar to one used in normal radical polymerization is used as the polymerization initiator, examples of which include potassium persulfate, ammonium persulfate, hydrogen peroxide, azobisisobutyronitrile, benzoyl peroxide, dibutyl peroxide, peracetic acid, cumene hydroperoxide, t-butyl hydroxyperoxide, and p-menthane hydroxyperoxide. In particular, as described before, if polymerization is carried out in water, a water-soluble polymerization initiator is preferable.

Examples of the emulsifying agent to be used in the polymerization reaction include sodium lauryl sulfate as well as those generally used as an anionic surfactant, nonionic surfactant, or amphoteric surfactant.

Also, examples of the chain transfer agent to be used in the polymerization reaction include: t-dodecyl mercaptan; n-dodecyl mercaptan; n-octyl mercaptan; xanthogens such as dimethylxanthogen disulfide and diisobutylxanthogen disulfide; dipentene; indene; 1,4-cyclohexadiene; dihydrofuran; and xanthene.

Furthermore, for the same reason as in the above-described penetrating agent, in order to improve the smear resistance of images, such as characters or figures, the ink composition according to the invention may contain a surfactant other than the above-mentioned acetylene glycol based surfactant. Examples of that surfactant include amphoteric surfactants and nonionic surfactants. Examples of amphoteric surfactants include: lauryl dimethylaminoacetic acid betaine; 2-alkyl-N-carboxymethyl-N-hydroxyethyl imidazolinium betaine; coconut oil fatty acid amidopropyl dimethylaminoacetic acid betaine; polyoctyl polyaminoethyl glycine; and other imidazoline derivatives. Examples of nonionic surfactants include: ether type surfactants such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether; ester type surfactants such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; silicon-based surfactants such as dimethylpolysiloxane; and other fluorine-containing surfactants such as alkyl ester having a fluorine atom and perfluoroalkyl carboxylate. These may be used alone or in a combination of two or more types.

The ink composition according to the invention may further contain saccharides, preservatives and fungicides for the same reason as in the above-mentioned water-soluble glycols, i.e., to prevent nozzle clogging.

Examples of the saccharides include glucose, mannose, fructose, ribose, xylose, arabinose, lactose, galactose, aldonic acid, glucitol, maltose, cellobiose, sucrose, trehalose, maltotriose, alginic acid and salts thereof, as well as cyclodextrins and celluloses, and these may be used alone or in a combination of two or more types, with the content in the ink composition according to the invention being preferably 0 to 15% by weight.

Examples of the preservatives and fungicides include sodium benzoate; sodium pentachlorophenol; sodium-2-pyridinethiol-1-oxide; sodium sorbate; sodium dehydroacetate; and 1,2-benzisothiazoline-3-on (Proxel CRL, Proxel BDN, Proxel GXL, Proxel XL-2, and Proxel TN, all available from Avecia Limited), and these may be used alone or in a combination of two or more types, with the content in the ink composition according to the invention being preferably 0.01 to 0.5% by weight.

In order to prevent clogging and to achieve reliability in terms of discharge stability, etc., it is preferable that the ink composition according to the invention contain a chelating agent such as EDTA, with the content in the ink composition being preferably 0.01 to 0.5% by weight.

If the surface of the self-dispersing pigment is anionic, it is preferable that the ink composition according to the invention has a pH value of 6 to 11, more preferably 7 to 10, to improve printing thickness and liquid stability. In order to have the ink composition within the above range of pH values, it is preferable to include a pH regulator, examples of which include: inorganic alkalis such as sodium hydroxide, potassium hydroxide and lithium hydroxide; and tertiary amines having a carbon number of 6 to 10 such as ammonia, triethanolamine, ethyldiethanolamine, diethylethanolamine and tripropanolamine. These pH regulators may be used alone or in a combination of two or more types, with the content in the ink composition according to the invention being preferably 0.01 to 2% by weight.

The ink composition according to the invention may further include, as required, various additives such as surface tension regulators, viscosity regulators, oxidation inhibitors, ultraviolet absorbers, antifoamers, and oxygen absorbers. These additives may be used alone or in a combination of two or more types.

In order to increase discharge stability and further improve reliability, it is preferable that the surface tension of the ink composition according to the invention is 20 to 40 mN/m, and more preferably 25 to 34 mN/m. In order to have the surface tension within the above range, the above-mentioned surface tension regulators may be included. The surface tension of the ink composition is measured in accordance with JIS K3211.

In order to increase discharge stability and further improve reliability, it is preferable that the viscosity of the ink composition according to the invention at a temperature of 20° C. is 2 to 10 mPa·s, and more preferably 3 to 6 mPa·s. In order to have the viscosity of the ink composition within the above range, the above-mentioned viscosity regulators may be included. Examples of the viscosity regulators include: rosins; alginic acids; polyvinyl alcohol; hydroxylpropyl cellulose; carboxymethyl cellulose; hydroxyethyl cellulose; methyl cellulose; polyacrylic acid salt; polyvinyl pirrolidone; gum arabic; and starch.

In preparing the ink composition according to the invention, it is preferable to remove coarse particles. For example, by filtering the mixture (ink) obtained by mixing the above-described respective components using a metal filter, a membrane filter, or such other filters, particles having a 300 nm or larger particle diameter are removed. With such treatment, a highly reliable ink composition that does not cause nozzle clogging can be obtained.

The ink composition according to the invention has no limitation on applicable color types, etc. For example, it may be used for various color ink compositions (such as cyan, magenta, yellow, light cyan, light magenta, dark yellow, red, green, blue, orange, and violet), black ink compositions, and light black ink compositions. For application, the ink composition according to the invention may be used alone, or as an ink set composed of several types of ink compositions, or as an ink set composed of one or more types of ink compositions according to the invention and one or more other ink compositions.

The ink composition according to the invention may be applied to various types of recording media for making images, such as plain paper, inkjet-only paper, plastic, film, and metal, with no limitation on the media type.

According to the invention, an ink cartridge including the above-described ink composition is also provided. With the ink cartridge according to the invention, the convenient usage and handling of the above-described ink composition can be ensured.

According to the invention, a recording method for making an image on a recording medium by using the above-described ink composition is also provided. With one embodiment of the recording method according to the invention, the above-described ink composition droplets are discharged via an inkjet recording system, the droplets are adhered to a recording medium, and thereby printing is carried out. With the implementation of the recording method according to the invention, ink properties such as ink viscosity are not changed, even after a long period of time left unused, and high reliability in terms of stable inkjet discharge performance can be ensured.

According to the invention, an article recorded by making an image on a recording medium using the above-described ink composition is also provided. The article recorded according to the invention has high quality because it is recorded using the ink composition with stable inkjet discharge performance.

According to the invention, a recording system for making an image using the above-described ink composition is also provided. More specifically, the invention can suitably provide a recording device such as an inkjet printer using the ink composition according to the above-described embodiments, and other recording systems.

The invention provides the above-described preferred embodiments. However, the invention is not limited to these embodiments, and various modifications may be made without departing from the spirit of the invention.

According to the invention, provided is an ink composition for inkjet recording that has no change in properties such as viscosity, even after it is left unused for a long period of time, and that can achieve high reliability in terms of stable inkjet discharge performance, even with a high solid content.

Furthermore, according to the invention, provided are an ink cartridge, a recording method, a recording system, and an article recorded using the above-described excellent ink composition for inkjet recording, and a pigment dispersed liquid useful for that ink composition.

EXAMPLES

The invention is described below in greater detail referring to examples of the invention. However, the invention is not limited in any way by those examples.

By oxidizing the surface of a pigment using the respective methods stated below, pigment dispersions A, B, and C were obtained.

Pigment Surface Oxidation—Sulfonation

A solvent mixed with a pigment was subjected to high-speed shear dispersion using a high-speed mixer or similar, or to shock dispersion using a bead mill, jet mill or similar, so that a slurry pigment dispersion was obtained. The pigment dispersion was mixed with a treatment agent containing sulfur (such as sulfamic acid, fuming sulfuric acid, sulfuric acid, chlorosulfuric acid, fluorosulfuric acid, or amidosulfuric acid) while being slowly agitated, and then was heat-treated at a temperature of 60 to 200° C. to introduce the before-explained dispersibility-imparting groups on the surface of the pigment. After removing the solvent from the pigment dispersion, the treatment agent containing sulfur was removed by repeating the processes of water washing, ultrafiltration, reverse osmosis, centrifugation, filtration, or similar, so that a self-dispersing pigment dispersion having a pigment concentration of 15% by weight was obtained (pigment dispersion A). "Microjet CW1" from Orient Chemical Industries, Ltd., for example, corresponds to this.

Pigment Surface Oxidation—Salt of Hypochlorous Acid Oxidation 100 g of Color Black S170 (commercially manufactured carbon black, available from Degussa-Hüls AG) was mixed with 1 kg of water, and was subjected to ball mill crushing using zirconia beads. 1400 g of sodium hypochlorite (with an effective chloride concentration of 12%) was then dripped into the resulting liquid, reacted for five hours while being subjected to ball mill crushing, and was further subjected to wet oxidation by being boiled for four hours while being agitated. The obtained liquid was filtered using a glass fiber filter GA-100 (product name, from Advantec Toyo Kaisha, Ltd.), and was further subjected to water washing. The obtained wet cake was again dispersed in 5 kg of water, desalted and refined by using a reverse osmosis filter until the conductivity was 2 mS/cm, and further concentrated until the pigment concentration was 18% by weight. Thus, a self-dispersing pigment dispersion was obtained (pigment dispersion B).

Pigment Surface Oxidation—Ozone Oxidation 20 g of #3350 (commercially manufactured carbon black, from Mitsubishi Chemical Corporation) was mixed with 500 g of water, and was subjected to dispersing using a household mixer for five minutes. The obtained liquid was put into a 3-liter glass container with an agitator, and ozone-containing gas having an ozone concentration of 8% by weight was introduced at a rate of 500 cc/minute while being agitated with the agitator. In this process, ozone was generated by using an electrolytic ozonizer manufactured by Perumerekkusu Denkyoku Kabushikikaisha. The obtained liquid was filtered using a glass fiber filter GA-100 (product name, from Advantec Toyo Kaisha, Ltd.), and was further subjected to the addition of a 0.1 N potassium hydroxide solution and to concentration while being regulated to have a pH value of 9 until the pigment concentration was 20% by weight. Thus, a self-dispersing pigment dispersion was obtained (pigment dispersion C).

Solvent Addition Step (1) 1,2-hexanediol was added to a dispersion so that the content was 10% by weight in total.
(2) Glycerin and triethylene glycol monobutyl ether were added to a dispersion so that the respective contents were 10% by weight in total and 5% by weight in total.
(3) Glycerin, triethylene glycol monobutyl ether and Surfynol 465 (from Air Products and Chemicals, Inc.) were added to a dispersion so that the respective contents were 15% by weight in total, 5% by weight in total, and 2% by weight in total.
(4) Glycerine, triethylene glycol monobutyl ether, and 2-pyrrolidone were added to a dispersion so that the respective contents were 10% by weight in total, 2% by weight in total, and 8% by weight in total.

Heating Step.

Heating step A: A dispersion was heated at a temperature of 70° C. for 20 hours resulting in a pigment dispersed liquid.

Heating step B: A dispersion was heated at a temperature of 100° C. for 7 hours resulting in a pigment dispersed liquid.

The pigment dispersed liquids according to Examples 1 to 8 were respectively prepared by following the steps described in Table 1 below.

TABLE 1

| | Dispersion | Solvent addition/Heating steps (in sequential order) |
|---|---|---|
| Example 1 | Pigment dispersion A ⇒ | Solvent (1) ⇒ Heating step A |
| Example 2 | Pigment dispersion B ⇒ | None ⇒ Heating step B |
| Example 3 | Pigment dispersion B ⇒ | Solvent (2) ⇒ Heating step B |
| Example 4 | Pigment dispersion B ⇒ | Solvent (4) ⇒ Heating step B |
| Example 5 | Pigment dispersion B ⇒ | Heating step B ⇒ Solvent (4) |
| Example 6 | Pigment dispersion C ⇒ | Solvent (3) ⇒ Heating step A |
| Example 7 | Pigment dispersion C ⇒ | Heating step A ⇒ Solvent (3) |
| Example 8 | Pigment dispersion C ⇒ | Solvent (1) ⇒ Heating step A |

Comparative Example

The pigment dispersed liquid according to Comparative Example 1 was prepared by following the same steps as in Example 1, except without performing the solvent addition step or heating step, —a self-dispersing pigment dispersion obtained by the pigment surface oxidation step in Example 1.

Preparation of an Ink Composition

According to the below composition, each component was added so that the total amount of the resulting substance was 100 g. After that, the resulting substance was agitated for 2 hours at room temperature, filtered using a membrane filter having a pore diameter of 5 μm (from Nihon Millipore K.K), resulting in the preparation of an ink composition (aqueous ink).

| | |
|---|---|
| Pigment dispersed liquid obtained as above: | 7% by weight (pigment solid content) |
| Surfynol 104PG50: (product name, from Air Products and Chemicals, Inc.) | 0.5% by weight |
| Surfynol 465: (product name, from Air Products and Chemicals, Inc.) | 1% by weight |
| Trimethylolpropane: (solid wetting agent) | 5% by weight |
| Glycerin: | 7% by weight |
| Triethylene glycol monobutyl ether: (penetrating agent) | 2% by weight |
| 1,2-hexanediol: | 4% by weight |
| Ultrapure water: | Balance |

For each of the prepared ink compositions, their properties (viscosity) were measured, and various printing was performed using an inkjet printer PX-V700 (from Seiko Epson Corporation) at a resolution of 360 dpi. Based on that, each ink composition was evaluated with respect to the below evaluation testing factors.

Evaluation Testing (1)—Ink Composition Stability

For each ink composition, the change in viscosity (at a temperature of 20° C.) between an ink composition immediately after being manufactured and one left unused for one year at room temperature (25° C.) was evaluated in accordance with the below standards.

Rank AA: Viscosity change amount less than 0.1 mPa·s.
Rank A: Viscosity change amount 0.1 mPa·s or more but less than 0.2 mPa·s.
Rank B: Viscosity change amount 0.2 mPa·s or more.

Evaluation Testing (2)—Discharge Stability

After each ink composition was left unused for one year at room temperature (25° C.), the below evaluation was performed.

The printing pattern of 100% patch and line was printed continuously in a 40° C. temperature environment.

The nozzle was checked before the continuous printing to confirm that it was full, and then the evaluation commenced. During the printing, every time any abnormality such as missing dots, ink spatters or bending occurred, corrective cleaning was performed. The number of cleanings required during the continuous printing of 100 pages of A4-size paper was evaluated based on the below standards.

Rank A: The number of cleanings was 0.
Rank B: The number of cleanings was 1 or 2.
Rank C: The number of cleanings was 3 or more.

The evaluation results are shown in Table 2 below.

TABLE 2

| | Ink composition stability | Discharge stability |
|---|---|---|
| Example 1 | A | A |
| Example 2 | A | A |
| Example 3 | AA | A |
| Example 4 | AA | A |
| Example 5 | A | A |
| Example 6 | AA | A |
| Example 7 | A | A |
| Example 8 | A | A |
| Comparative Example 1 | B | C |

The invention is industrially applicable as an ink composition for inkjet recording that has no change in properties such as viscosity, even after it is left unused for a long period of time, and that can achieve high reliability in terms of stable inkjet discharge performance, even with a high solid content. The invention is also industrially applicable as an ink cartridge, a recording method, a recording system and an article recorded using the above ink composition, and as a pigment dispersed liquid that is useful for the above ink composition.

What is claimed is:

1. A method for producing a pigment dispersed liquid comprising the steps of
   (i) providing a pigment dispersion containing (a) a self-dispersing pigment obtained by surface treatment of a pigment, (b) water and (c) an organic solvent, said pigment dispersion not containing a dispersing resin; and
   (ii) heat-treating the pigment dispersion to form the pigment dispersed liquid such that an ink composition comprising the pigment dispersed liquid has a more stable viscosity than if the pigment dispersion were not subject to the heat-treating.

2. The method according to claim 1, wherein the organic solvent includes one or more types selected from the group consisting of glycerin, a glycol ether, an alkanediol, an acetylene glycol and a pyrrolidone.

3. The method according to claim 1, wherein the heat-treatment is performed with a temperature of 50 to 100° C. and a duration of 2 to 72 hours.

4. The method according to claim 1, wherein the pigment concentration in the pigment dispersed liquid is 10% or more by weight.

5. A method for producing a pigment dispersed liquid comprising the steps of:
   (a) performing a surface treatment on a pigment
   (b) preparing a pigment dispersion containing the pigment on which the surface treatment has been performed, an organic solvent and water but not containing a dispersion resin;
   (c) heat-treating the pigment dispersion.

6. The method according to claim 5, wherein the heat-treating is performed at a temperature and for a duration to form the pigment dispersed liquid such that an ink composition comprising the pigment dispersed liquid has a more stable viscosity than if the pigment dispersion were not subject to the heat-treating in step (c), said temperature being 50 to 100° C. and said duration being 2 to 72 hours.

* * * * *